United States Patent
Himpe

(10) Patent No.: US 10,324,666 B2
(45) Date of Patent: Jun. 18, 2019

(54) PROCESS FOR LAYOUT AND PRINTING OF IMAGES IN MULTIPLE LANES WITH DIFFERENT REPEAT LENGTHS

(71) Applicant: ESKO Software BVBA, Ghent (BE)

(72) Inventor: Johan Himpe, Ghent (BE)

(73) Assignee: ESKO SOFTWARE BVBA, Ghent (BE)

( * ) Notice: Subject to any disclaimer, the term of this patent is extended or adjusted under 35 U.S.C. 154(b) by 0 days.

(21) Appl. No.: 16/078,118

(22) PCT Filed: Feb. 22, 2017

(86) PCT No.: PCT/EP2017/054065
§ 371 (c)(1),
(2) Date: Aug. 21, 2018

(87) PCT Pub. No.: WO2017/144533
PCT Pub. Date: Aug. 31, 2017

(65) Prior Publication Data
US 2019/0056892 A1    Feb. 21, 2019

Related U.S. Application Data

(60) Provisional application No. 62/298,576, filed on Feb. 23, 2016.

(51) Int. Cl.
*G06K 15/02* (2006.01)
*G06K 15/00* (2006.01)
(Continued)

(52) U.S. Cl.
CPC .......... *G06F 3/1219* (2013.01); *B41J 2/0057* (2013.01); *B41J 11/008* (2013.01); *G06F 3/1243* (2013.01); *G06F 3/1251* (2013.01)

(58) Field of Classification Search
CPC .... G06F 3/1219; G06F 3/1251; G06F 3/1243; B41J 2/0057; B41J 11/008
(Continued)

(56) References Cited

U.S. PATENT DOCUMENTS 6,976,798 B2    12/2005 Keane et al.
7,347,525 B2 *   3/2008 Mizes ................... G06K 15/02
                                                                      347/19

(Continued)

OTHER PUBLICATIONS

International Search Report issued in PCT/EP2017/054065 dated May 3, 2017, 3 pages.
(Continued)

*Primary Examiner* — Douglas Q Tran
(74) *Attorney, Agent, or Firm* — RatnerPrestia

(57) ABSTRACT

A printing system including a printing mechanism, a substrate feeder, a print controller, and digital information stored on computer readable media. The digital information includes one or more rows of a first image having a first repeat length side by side with one or more rows of a second image having a second repeat length different from the first repeat length, the first image side by side with the second image comprising a series of composite image groupings. The print controller is configured to access the stored digital information and control the print mechanism to cause the first and second images to be printed on a continuous web of substrate without excess white space between adjacent images or discontinuities caused by the different first and second repeat lengths, by periodically physically shifting the substrate in a reverse direction or by digitally shifting the image groupings before printing them.

21 Claims, 18 Drawing Sheets

(51) Int. Cl.
*H04N 1/393* (2006.01)
*G06F 3/12* (2006.01)
*B41J 11/00* (2006.01)
*B41J 2/005* (2006.01)

(58) Field of Classification Search
USPC .................................. 358/1.2, 1.1, 1.18, 1.6
See application file for complete search history.

(56) References Cited

U.S. PATENT DOCUMENTS

| | | |
|---|---|---|
| 8,009,330 B2 | 8/2011 | Dardikman et al. |
| 8,477,380 B2 | 7/2013 | Telem et al. |
| 8,704,850 B2 | 4/2014 | Raffman et al. |
| 9,663,261 B2 | 5/2017 | Azad et al. |
| 2003/0007167 A1* | 1/2003 | Catt ....................... G06K 15/00 358/1.12 |
| 2013/0050384 A1 | 2/2013 | Sugimoto |
| 2014/0199105 A1 | 7/2014 | Tsukuda |
| 2015/0346922 A1 | 12/2015 | Robertson |
| 2016/0210088 A1 | 7/2016 | Van Den Branden |
| 2019/0016081 A1 | 1/2019 | Widner et al. |

OTHER PUBLICATIONS

Written Opinion of the International Search Authority issued in PCT/EP2017/054065 dated May 3, 2017, 6 pages.
International Preliminary Report on Patentability and Written Opinion of the International Searching Authority for International Application No. PCT/EP2017/054065, dated Aug. 28, 2018, 7 pages.

\* cited by examiner

100

402

600

1000

PROCESS FOR LAYOUT AND PRINTING OF IMAGES IN MULTIPLE LANES WITH DIFFERENT REPEAT LENGTHS

This application is the U.S. National Phase Application of PCT/EP2017/054065, filed Feb. 22, 2017, which claims the benefit of priority of U.S. Provisional Application No. 62/298,576, entitled PROCESS FOR LAYOUT AND PRINTING OF IMAGES IN MULTIPLE LANES WITH DIFFERENT REPEAT LENGTHS, filed on 23 Feb. 2016, the contents of which are incorporated herein by reference in their entirety for all purposes.

FIELD

This invention relates generally to side-by-side printing of labels that have different repeat lengths on the same continuous web of substrate (e.g. paper). The invention seeks to reduce or eliminate white space on the printed paper caused by the different repeat lengths of the labels.

BACKGROUND

In operation of a conventional web-fed printer, printing occurs in a continuous manner. The substrate (e.g. paper) is fed into the printer from a roll, and as the substrate passes through the printer, information (e.g. labels) get printed on the substrate. Labels are typically printed in "frames" of a specified length as dictated by physical/technological limitations of the printer, and then repeated along the length of the web.

In some instances customers may want to print multiple labels (e.g. two or more) in different lanes next to each other (e.g. side-by-side) along the web. If the labels have the same size, then they also have the same repeat length (i.e. their tops and bottoms align with each other side-by-side on the web), and therefore fit equally in the designated "frames." However if labels have different sizes, then they also have different repeat lengths (i.e. they do not exactly align with each other when printed side-by-side), and therefore they do not fit equally within a given frame. This misalignment results in wasted substrate due to white space between label frames or partially printed labels within a frame.

BRIEF DESCRIPTION OF THE DRAWINGS

The drawing figures depict one or more implementations in accord with the present teachings, by way of example only, not by way of limitation. In the figures, like reference numerals refer to the same or similar elements.

SUMMARY

Figure 1:
FIG. 1 shows an example of a label that could be used for continuous web printing.

One embodiment includes a printing system including a printing mechanism for applying ink to a substrate, a substrate feeder for positioning a continuous web of substrate relative to the printing mechanism to receive the ink. The substrate feeder configured to at least advance the substrate in a forward direction such that the substrate advanced past the printing mechanism in the forward direction contains the ink applied thereto. Also included is digital information stored on computer readable media, the digital information including one or more rows of a first image having a first repeat length side by side with one or more rows of a second image having a second repeat length different from the first repeat length, the one or more rows of the first image side by side with the one or more rows of the second image comprising a series of composite image groupings, and adjacent composite image groupings in the series are not identical. The digital information also including instructions for manipulating the substrate feeder and the printing mechanism. Also included is a print controller configured to: access the stored digital information and control the print mechanism and substrate feeder based upon said stored digital information to cause the first and second images to be printed on a continuous web of substrate without excess white space between adjacent images or discontinuities between partial images in adjacent composite image groupings caused by the different first and second repeat lengths. Controlling the print mechanism and substrate feeder to print without the excess white space or discontinuities comprises one of: (a) periodically physically shifting the substrate in a reverse direction opposite the forward direction or (b) digitally shifting the image groupings before printing them.

One embodiment includes a printing system including a printing mechanism for applying ink to a substrate, a substrate feeder for positioning a continuous web of substrate relative to the printing mechanism to receive the ink, and digital information stored on computer readable media comprising a multipage document and instructions for manipulating the substrate feeder and the printing mechanism, the multipage document embodying one or more rows of a first image having a first repeat length side by side with one or more rows of a second image having a second repeat length different from the first repeat length. Adjacent pages in the multipage document are not identical and at least one set of adjacent pages comprises a first portion of one row of the first or second images on a first page and a second portion of the one row on a second page. Also included is a print controller configured to access the stored digital information and control the print mechanism and substrate feeder based upon said stored digital information to cause the first and second pages to print adjacent one another without a margin between them such that the first portion of the one row and the second portion of the one row print without a discontinuity.

One embodiment includes a method of printing comprising using a printing system including a printing mechanism for applying ink to a substrate, a substrate feeder for positioning a continuous web of substrate relative to the printing mechanism to receive the ink, and a print controller, the method comprising the steps of: (a) accessing digital information stored on computer readable media. The digital information embodying: (i) one or more rows of a first image having a first repeat length side by side with one or more rows of a second image having a second repeat length different from the first repeat length, the one or more rows of the first image side by side with the one or more rows of the second image comprising a series of composite image groupings, wherein adjacent composite image groupings in the series are not identical, and (ii) instructions for manipulating the substrate feeder and the printing mechanism, and (b) printing the first and second images on a continuous web of substrate without excess white space between adjacent images or discontinuities between partial images in adjacent composite image groupings caused by the different first and second repeat lengths. The printing includes one of: (i) periodically physically shifting the substrate in a reverse direction opposite the forward direction or (ii) digitally shifting the image groupings before printing them.

One embodiment includes a method of printing comprising using a printing system comprising a printing mechanism for applying ink to a substrate, a substrate feeder for positioning a continuous web of substrate relative to the printing mechanism to receive the ink, and a print controller. The method including the steps of: (a) accessing digital information stored on computer readable media, the digital information comprising a multipage document and instructions for manipulating the substrate feeder and the printing mechanism, the multipage document embodying one or more rows of a first image having a first repeat length side by side with one or more rows of a second image having a second repeat length different from the first repeat length, the adjacent pages in the multipage document are not identical and at least one set of adjacent pages comprises a first portion of one row of the first or second images on a first page and a second portion of the one row on a second page, and (b) printing the first and second pages adjacent one another without a margin between them, such that the first portion of the one row and the second portion of the one row print without a discontinuity.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

This invention relates to multiple labels being printed on a continuous web-fed press, using parallel lanes on the web (i.e. printed side-by-side). In general, each of the different labels has a different repeat length, and are printed on web-fed presses in a continuous manner (e.g. a roll of paper is fed into the press from a roll, and as the paper passes through the press, labels get printed on the paper).

Shown in FIG. 1 is an example of a product label that will be utilized for examples described throughout the detailed description. Although label 100 in FIG. 1 is shown as being relatively rectangular or square in shape, it is known that labels may take on any geometric shape (e.g., circle, triangle, etc.) for ultimately placing on a particular product.

Figure 2:
FIG. 2 shows multiple labels printed on a continuous web of paper.

Shown in FIG. 2 is an overhead view of a continuous web 200 that has multiple labels 100 printed thereon as the web is fed in direction 202. The multiple labels are distributed across and along the web in order to minimize the loss of the substrate (i.e., minimize white space). FIG. 2 shows that the labels are printed in eight rows and two columns along the web. It should be noted that the black rectangles on the right side of the web are marks placed on the web which are used by a finishing device (e.g., cutting device, not shown) further down the production line. It should be noted that although two columns of labels are shown for explanatory purposes in FIG. 2 and in various other Figures, that the number of columns could be any integer number greater than or equal to 1. The number of columns could be set based on width of the web and width of each label as well as other factors.

Figure 3:
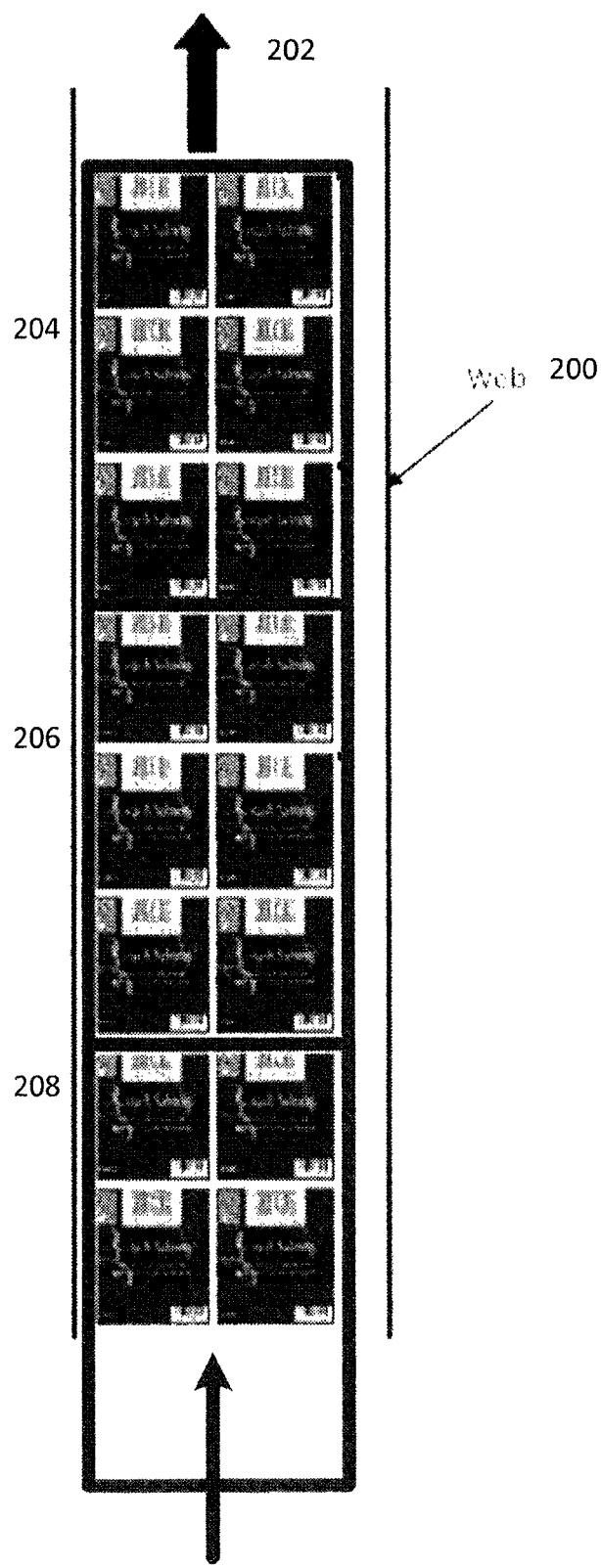
FIG. 3 shows the multiple labels printed on a continuous web of paper with their respective frames.

Although the webfed press prints continuously, data may be split into frames based on physical/technological limitations of the printer. For example, in a case of a digital printer the data stream is split into rectangular frames based on memory limitations. In a case of a drum based printer, the data stream is split into rectangular frames based on the circumference of the drum. In either case, these frames are illustrated in FIG. 3 in which the serial rows of labels are split into frames 204, 206 and 208, which each include three rows and two columns of the label (last row of frame 208 not shown to avoid clutter in the drawing). These frames are illustrated in FIG. 3 as bounded by dark black lines. Frames 204, 206 and 208 are then printed on web 200 as web 200 is fed into the printer in direction 202 (i.e., the feed direction).

The length of the frame (e.g., three labels vertically) is called the repeat length (i.e., when the frame repeats itself). As noted above, the data stream may be sliced into frames for various reasons including (1) the size of internal memory buffers in digital printers, and (2) the use of an intermediate drum to apply ink before transferring the ink onto the substrate. These two situations are now explained in more detail with reference to FIGS. 4 and 5.

Figure 4:
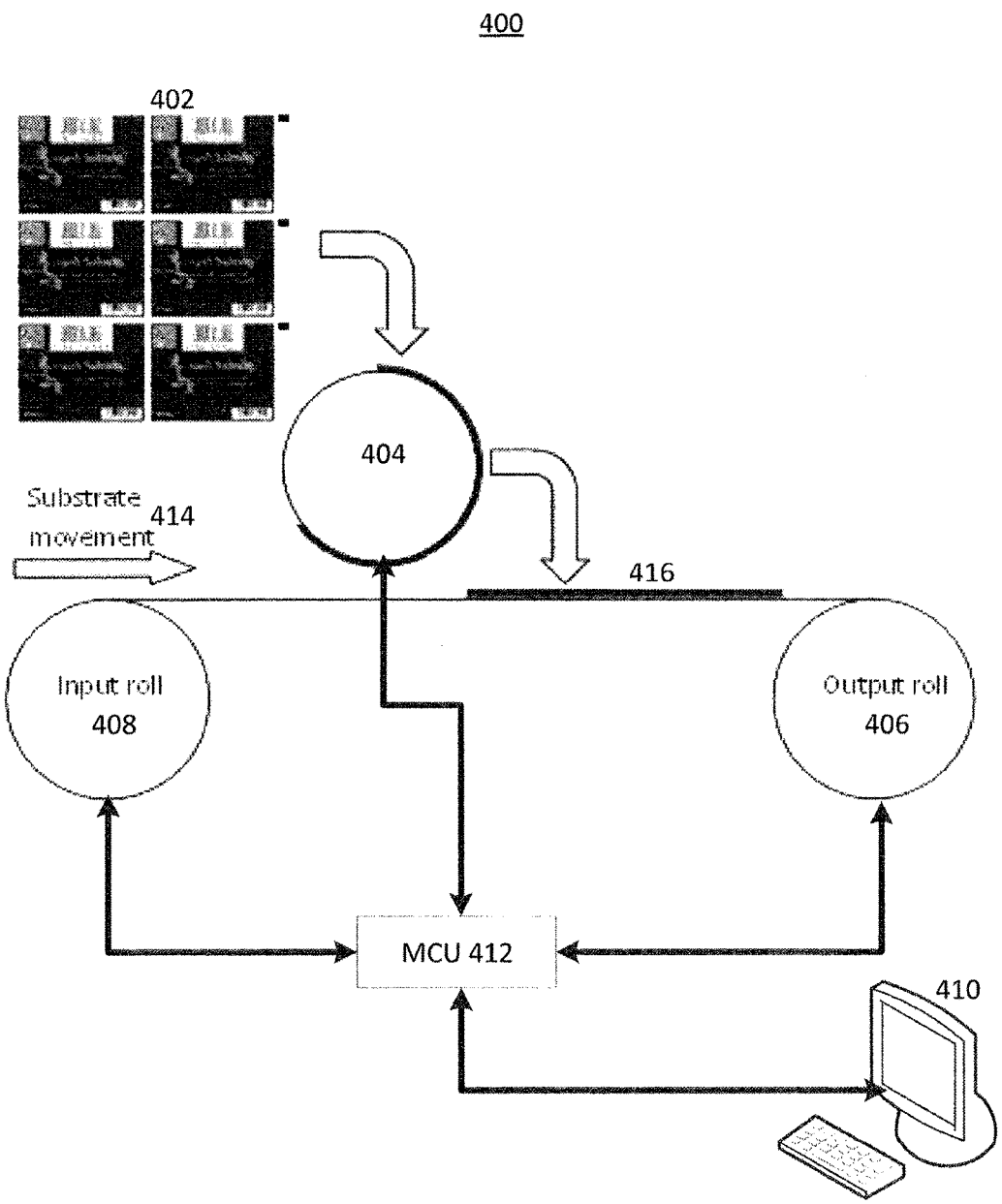
FIG. 4 shows an intermediate drum printing system.

Shown in FIG. 4 is a system diagram for an intermediate drum printing system. The intermediate drum printing system includes an intermediate drum 404, an input roll 408 of the substrate, an output roll 406 of the substrate, a microcontroller unit MCU 412 and a computer 410 for controlling the overall printing operation. During operation, the substrate moves in direction 414 as the substrate unwinds from input roll 408 and is rewound on output roll 406. Intermediate drum 404 applies the ink to the substrate as shown as element 416.

During operation, if the ink is first applied to an intermediate drum before transferring it onto the substrate, then the drum circumference is an upper limit for the length of the frame to be printed (i.e., the ink portion of the drum has a circumference and therefore dictates the length of the frame/repeat length for printing the labels 402). For example, if the circumference of the intermediate drum is 1 meter, then the frame size/repeat length can be a maximum of 1 meter. In the intermediate drum system shown in FIG. 4, labels 402 may be applied to the drum in the form of ink which is then rolled onto substrate to produce the printed labels 416. Intermediate drum 404 effectively transfers the ink image onto the substrate.

Operation of the intermediate drum system 400 shown in FIG. 4 is controlled by a computer 410 that may be used by an operator of the printer. The operator may send commands to microcontroller unit 412 which then controls the direction and speed of intermediate roller 404, input roller 408, output roller 406, as well as ink of the intermediate drum among others.

Figure 5:
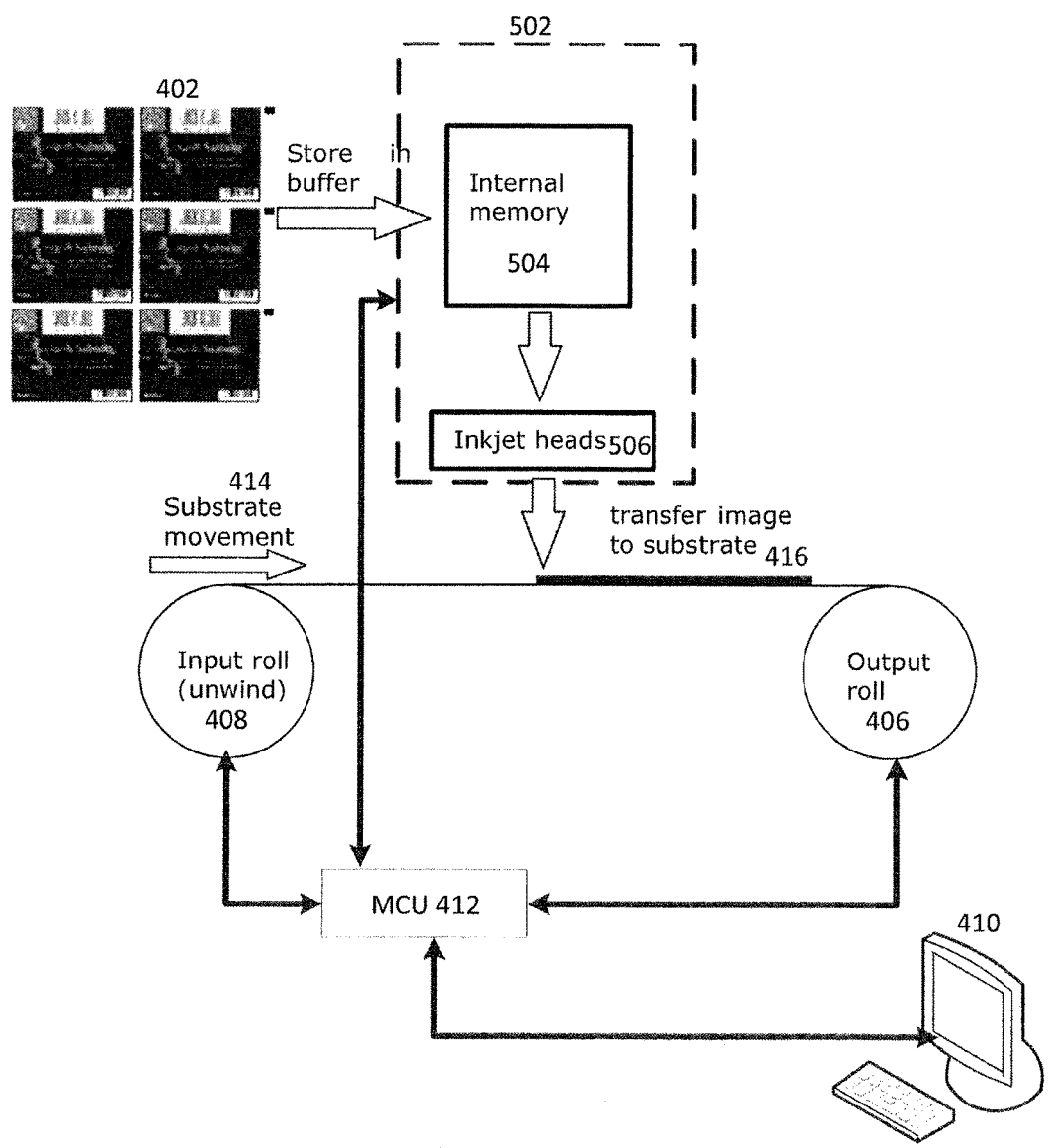
FIG. 5 shows an inkjet printing system.

In another example, shown in FIG. 5, the printer may be a digital printing system 500 that includes an ink jet printer 502 having both internal memory 504 and ink jet heads 506 for applying ink to the substrate. Similar to the intermediate drum example shown in FIG. 4, the ink jet printing system also includes an input roll 408 and an output roll 406, which together move the substrate in direction 414 underneath ink jet heads 506, which ultimately apply ink to the substrate to create the transferred image 416. Also similar to FIG. 4, the ink jet printing system may include a microcontroller unit 412 and a computer 410 for controlling the overall printing system.

In the digital printing system 500 shown in FIG. 5, the computer 410 stores label frame 402 in internal memory 504 of the ink jet printer 502. The computer 410 then instructs the microcontroller unit 412 to control the speed and direction of input roll 408 and output roll 406, as well as the printing operation of ink jet heads 506 based on label frame 402.

Since the digital printer system 500 in FIG. 5 uses internal memory buffers 504 to store the data (i.e., the frames) which need to be printed, the size of these buffers will define an upper limit for the frame to be printed (e.g., the frame 402 may have a maximum size of three rows by two columns because of limited memory in internal memory 504).

When utilizing the intermediate drum printing system 400 in FIG. 4 or the digital printing system 500 in FIG. 5, users may want to print multiple labels in different lanes next to each other (i.e. side-by-side) on the same wide web. The different lanes may later be separated to accommodate existing finishing devices (e.g., the devices that cut and perform other finishing processes on the printed labels) made for use with a narrower web (e.g. half the width of the wide web). In such a configuration, the web may be cut immediately after the printing process to enable the finishing device to work on a narrower web.

FIGS. 6-18 (see description below) show examples of configuring and printing two types of labels (see FIG. 6) side-by-side on the same web. It should be noted, however, that the number of different types of labels printed side-by-side on the same web could be any integer number greater than or equal to 2 (i.e. there could be more than two lanes of labels). The number of different types of labels to be printed may be set based on width of the web and width of each label as well as other factors.

Figure 6:
FIG. 6 shows two different labels with different sizes and therefore different repeat lengths.
Figure 6:
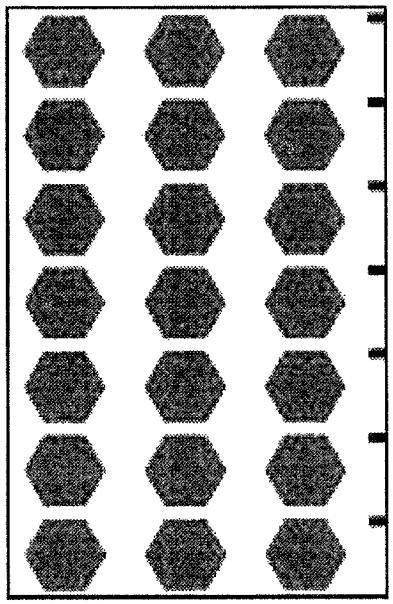

When the labels printed side-by-side in different lanes on the wider web have the same size, they also have the same repeat length. However, labels with different heights have different repeat lengths. An example of two different labels having different repeat lengths is shown in FIG. 6, which shows square product labels 402 (referred to as Label A) and the hexagonal labels 600 (referred to as Label B), in which Label B has a much smaller height than Label A.

To print these two labels side-by-side on the same wide web, the printing system needs to assign frame sizes that accommodate both labels. Having a single frame for both labels is shown in two different examples as frame 700 in FIG. 7 and frame 800 in FIG. 8. The different repeat lengths inherently cause one of two scenarios.

Figure 7:
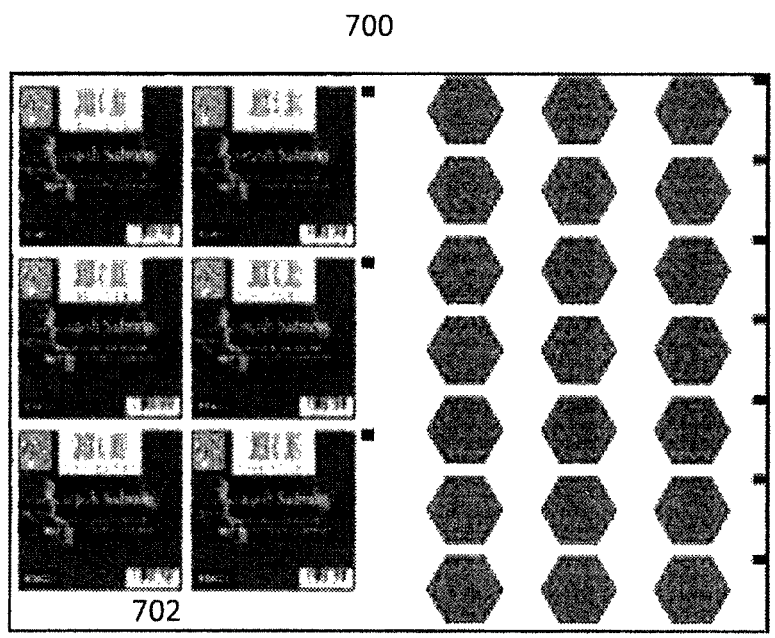
FIG. 7 shows the two different labels from FIG. 6 printed side-by-side on two lanes of the web of paper resulting in wasted whitespace.
Figure 8:
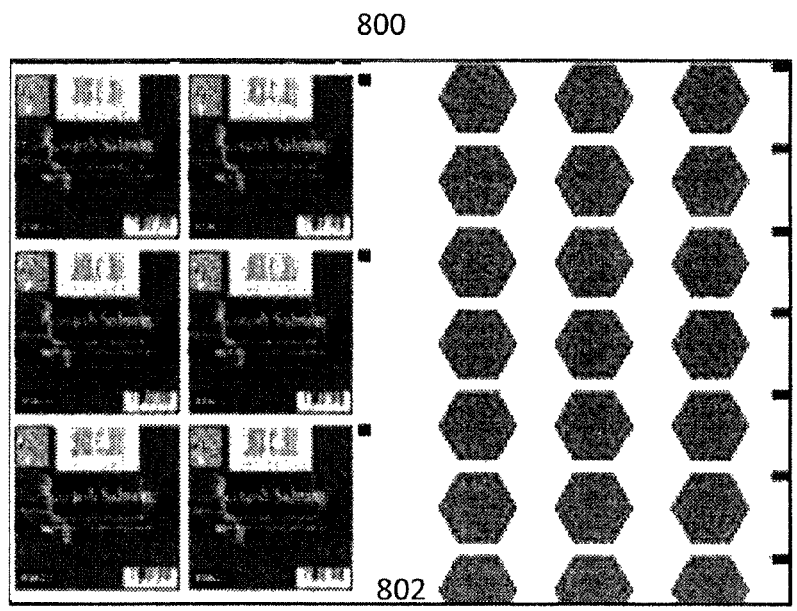
FIG. 8 shows the two different labels from FIG. 6 printed side-by-side on two lanes of the web of paper resulting a partially printed label.

In a first scenario shown in FIG. 7, the frame includes white space 702 below the square labels if the frame size is dictated by the repeat length of smaller Label B. Alternatively, if the frame size is dictated based on the repeat length of larger Label A, bottom row 802 of Label B may be partially cut off (i.e., the bottom row only partially fits in the frame). Absent implementation of one of the embodiments of the present invention, printing two different labels having two different repeat lengths on the same web may result in either unprinted white space, which is a waste of the substrate, or a repeating pattern of partially printed labels with a discontinuity between the partially printed labels rendering the partial labels unusable, and therefore also wasteful.

Now disclosed are multiple variations of a solution for fixing the problem discussed above with respect to FIGS. 7 and 8. In general, the solution avoids both unwanted white space and partially printed labels by performing either a digital shift of the data in the frame, or a physical shift of the substrate during the printing process.

Figure 9:
FIG. 9 shows two different cells of the two labels.
Figure 9:
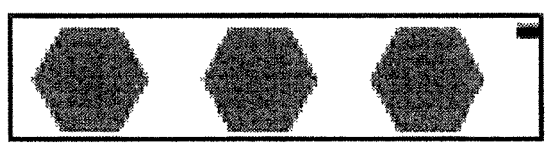

In a first embodiment, a full layout of the frame is postponed until after a RIP (i.e., Raster Image Processing) process is performed which converts an image into raster graphics such as a bitmap that can be utilized by the printer. In this embodiment, the labels may be put through the RIP (i.e., converted from an image file to a bitmap) on a row by row basis as shown by row 900 and row 902 of label A and label B in FIG. 9. Each of the two rows 900 and 902 shown in FIG. 9 are considered to be a respective cell of labels (e.g. Cell A and Cell B). In actually implementation, each cell is not restricted to the size shown in FIG. 9, but may contain multiple label rows as shown by cell 1000 in FIG. 10 (i.e. Cell 900 in FIG. 9 is duplicated to create a larger cell).

Figure 10:
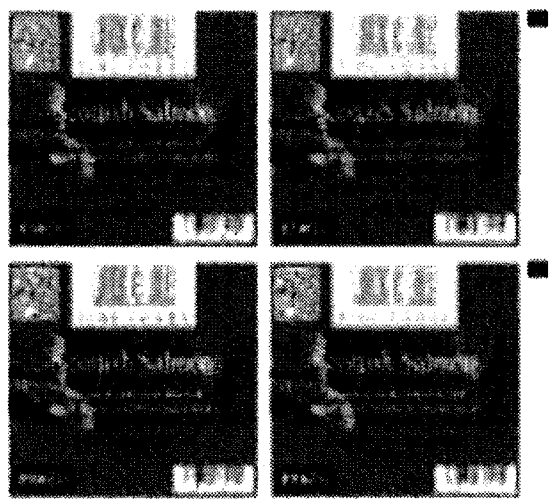
FIG. 10 shows a two-by-two cell of one label.
Figure 11:
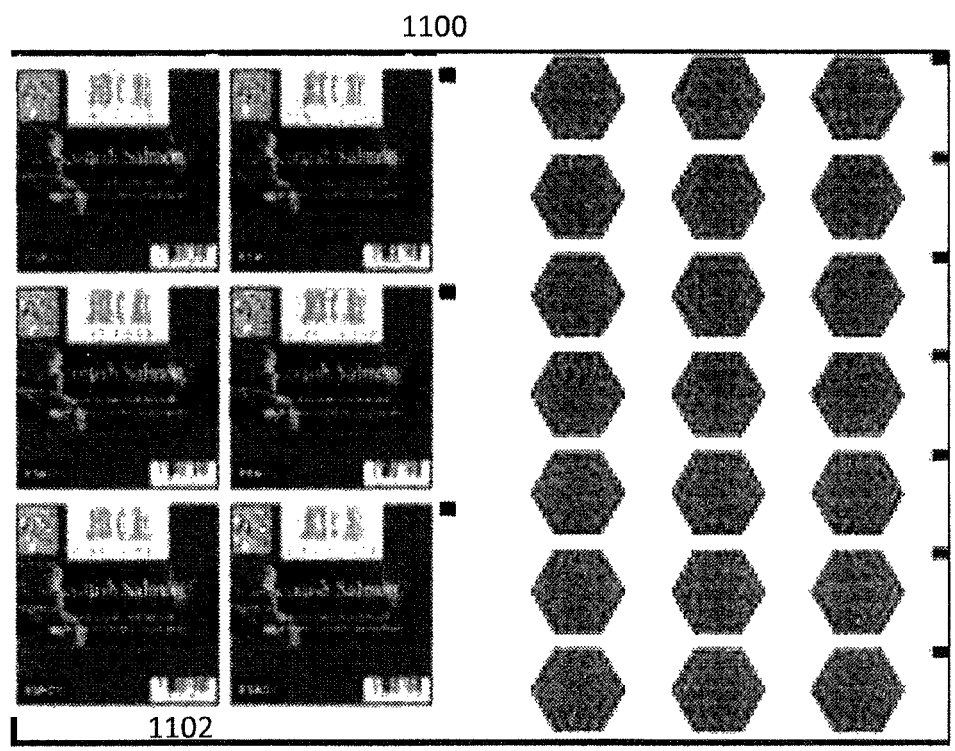
FIG. 11 shows a frame including two different labels with different repeat lengths produced by duplicating smaller label cells.

Prior to printing, the system (e.g., computer 410) duplicates the cells in either FIG. 9 or 10 to generate a complete frame of labels. This complete frame is shown, for example, as complete frame 1100 in FIG. 11 which includes three rows of label A and seven rows of label B. Frame 1100 shown in FIG. 11 also includes white space 1102 due to the different lengths of label A and label B.

Figure 12:
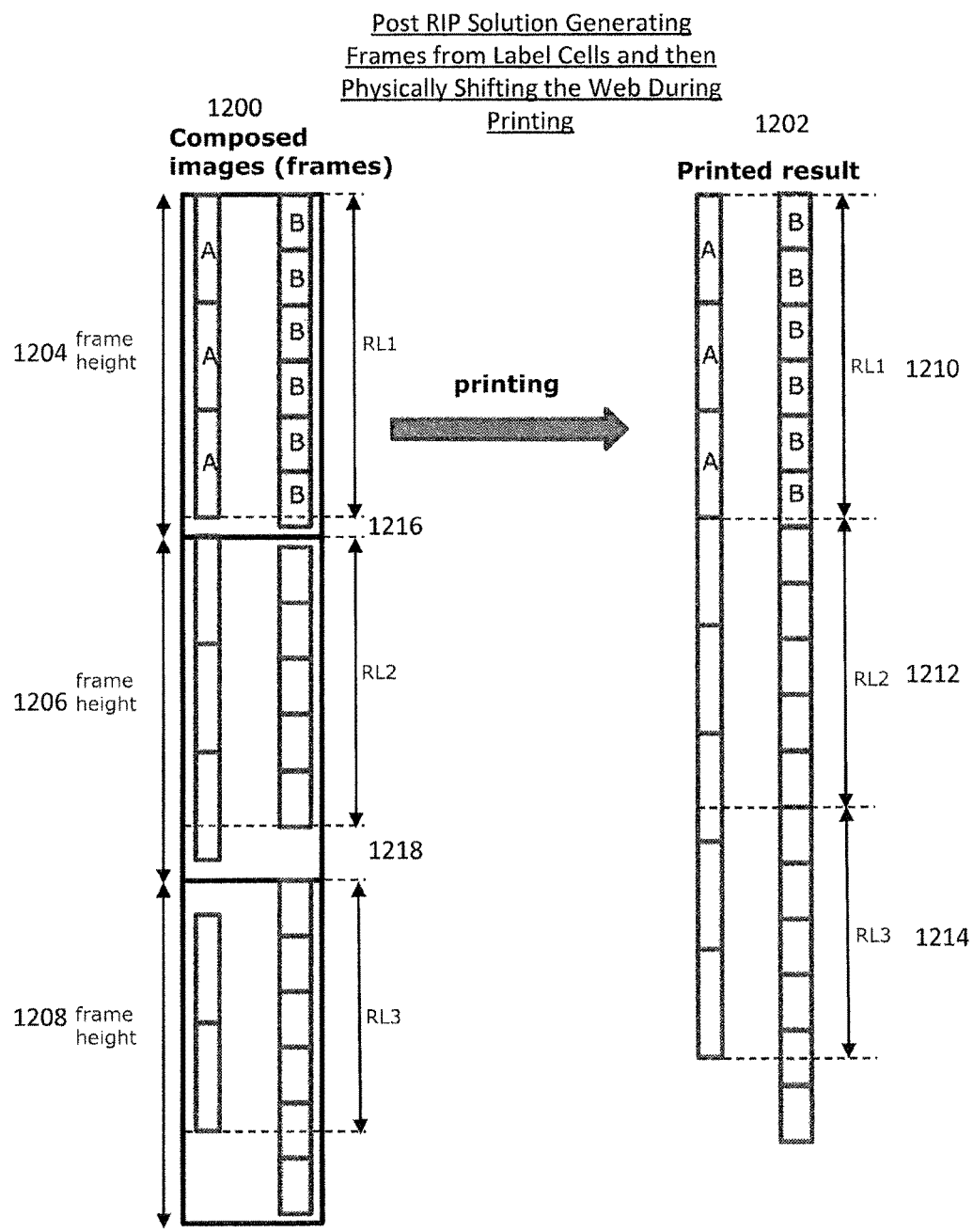
FIG. 12 shows frames of labels and printed results of those labels where the frames are generated by duplicating label cells, and the printed results are generated by physically shifting the web of paper to eliminate whitespace.

In order to reduce and/or eliminate white space 1102 on the printed substrate, the substrate is physically shifted during the printing process. An example of this physical shifting process is shown in an exemplary post-RIP solution of FIG. 12 in which a series of composed frames 1200, including frames 1204, 1206 and 1208 produce printed results 1202, including sections 1210, 1212 and 1214, printed on the web. As shown in FIG. 12, each frame includes repeat lengths RL1, RL2 and RL3 which are less than the overall frame heights for each of the frames 1204, 1206 and 1208. This results in a white space 1216 between frames 1204 and 1206 and another whitespace 1218 between frames 1206 and 1208. This whitespace is the amount of distance that the image frames need to be shifted to eliminate the white space between respective frames. This distance translates into a physical distance that the substrate may be shifted during the printing process in order to ensure the labels are continuously printed without any white space.

One operation of this shifting process is described as follows. In either the intermediate drum printing system 400 shown in FIG. 4 or the digital printing system 500 shown in FIG. 5, the microcontroller unit 412 utilizes distances 1216 and 1218 in order to control the substrate to properly print the labels in a continuous manner (i.e. converts the pixel distance to a physical distance). For example, at the end of printing the labels from frame 1204, the microcontroller unit 412 instructs either the intermediate printing drum 404 or the ink jet printer 502 to stop printing while microcontroller 412 instructs input roll 408 and output roll 406 to stop feeding the substrate in direction 414, and to shift backwards in the opposite direction by the distance corresponding to space 1216. After the physical shift of the web, the microcontroller unit 412 instructs the printer to resume printing. This stopping and shifting process is again performed between the frame 1206 and frame 1208 to shift the web the distance dictated by 1218. This results in printed results 1202 without the white spaces and without any discontinuities between partial labels.

Figure 15:
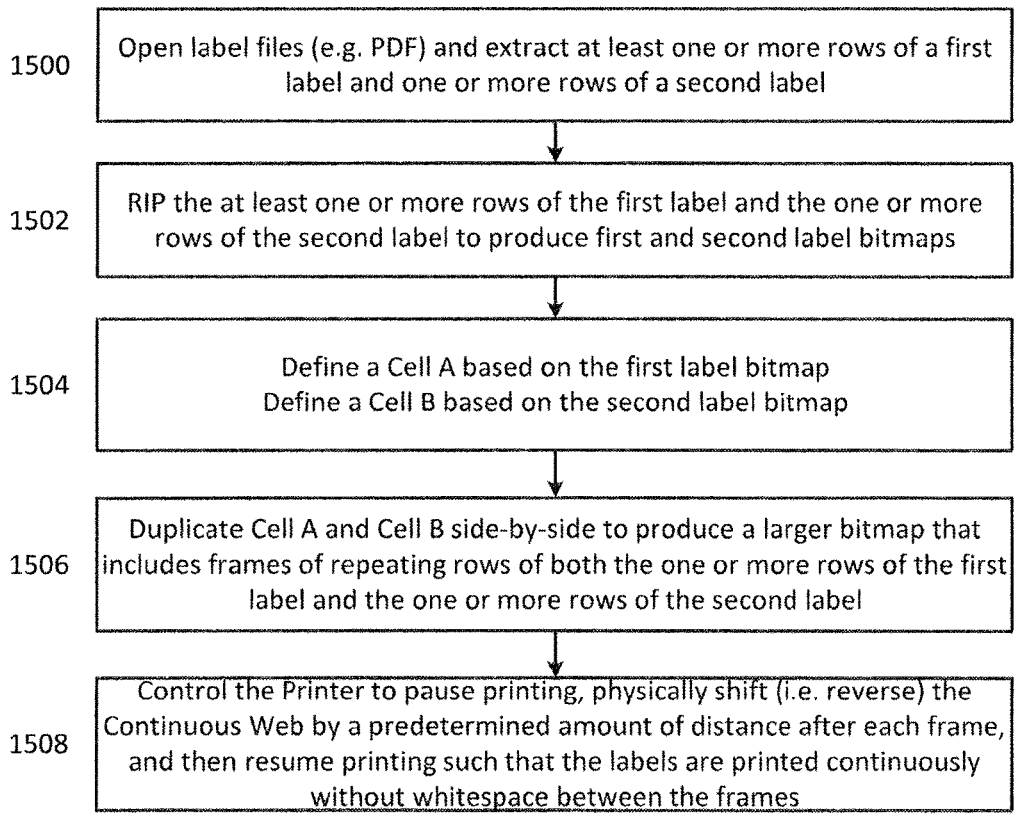
FIG. 15 shows a flowchart of an algorithm for printing labels according to FIG. 12.

A post-RIP solution for FIG. 12 is described in more detail in the flowchart of FIG. 15. In step 1500, the label file is opened and rows of label A and label B are extracted. In step 1502, the rows are then RIPed (i.e. converted) into first and second label bit maps (e.g. bitmap A and bitmap B). In step 1504, the system defines a first cell (e.g. Cell A) based on the first label bitmap, and defines a second cell (e.g. Cell B) based on the second label bitmap. In step 1506, the system duplicates Cell A and Cell B side-by-side multiple times in order to produce a larger bitmap that includes frames of repeating rows for both label A and label B. In step 1508, the system then controls the printer to pause printing, physically reverse and shift the continuous web by a predetermined amount of distance between each frame and then resume printing. This results in continuously printed labels without white space between the frames.

In embodiments with more than two labels (e.g. N labels) to be printed on the same web, the printing algorithm in FIG. 15 is similar. For example, each of the N labels is: 1) extracted from their respective files, 2) RIPed (i.e. converted) into bitmaps, 3) defined as N respective Cells, and then 4) duplicated side-by-side in order to produce the larger bitmap of N lanes for printing.

Figure 13:
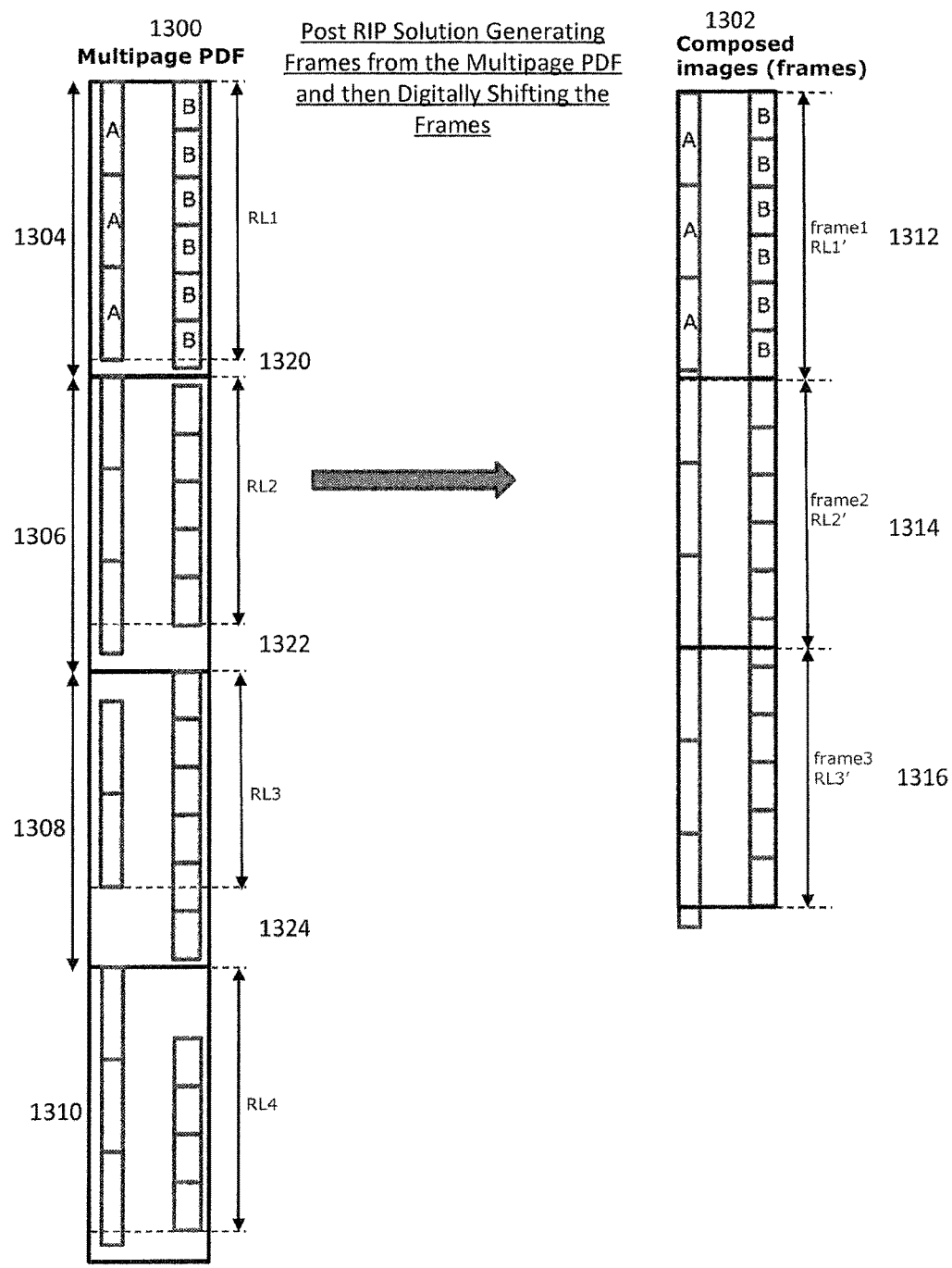
FIG. 13 shows a multipage PDF of labels and corresponding frames of those labels, where the frames are generated by label pages and then digitally shifted.
Figure 14:
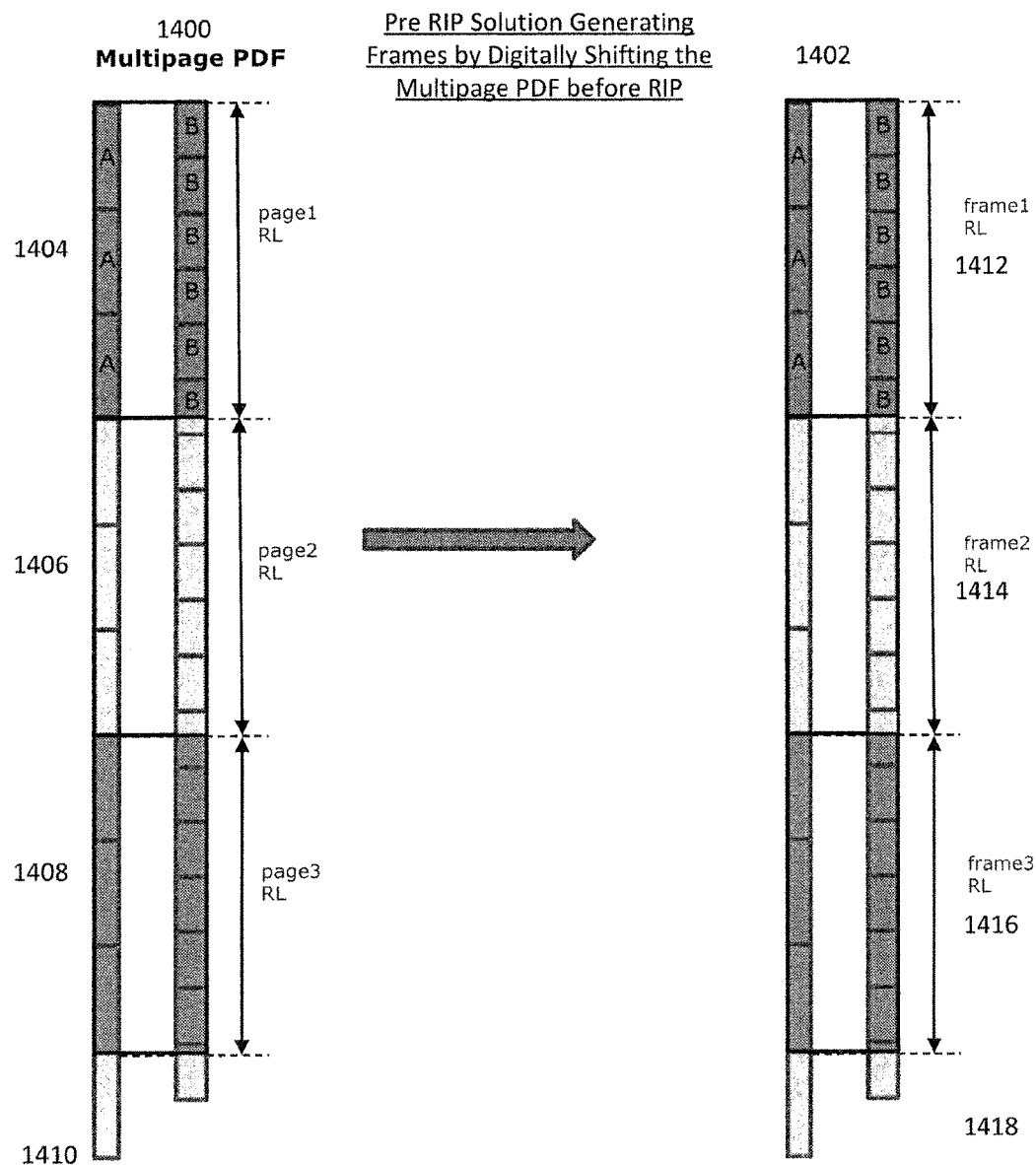
FIG. 14 shows a multipage PDF of labels and corresponding frames, where the multipage PDF is digitally shifted prior to generating the frames.

In another embodiment shown in FIG. 13, another post-RIP solution may simply RIP each page of a multi-page label file (e.g., a multi-page PDF) rather than creating the smaller cells. For example, FIG. 13 shows a multi-page label file 1300 which includes pages 1304, 1306, 1308 and 1310. Each of these pages within the PDF file includes white spaces between each page. These white spaces between each page are shown as 1320, 1322 and 1324, respectively.

During operation, the computer RIPs each one of these PDF pages one by one into a bitmap. This bitmap may then be passed along to the printer, where the printer performs a digital shift on each of the RIPed bitmaps in order to produce frames that do not include white space. For example, the printer may shift the RIPed digital images 1304, 1306 1308 and 1310 to eliminate white spaces 1320, 1322 and 1324 thereby producing frames 1312, 1314 and 1316 that do not include white space. Since these composed frames do not include white space, they can simply be printed (i.e. physical shift is not needed).

Figure 16:
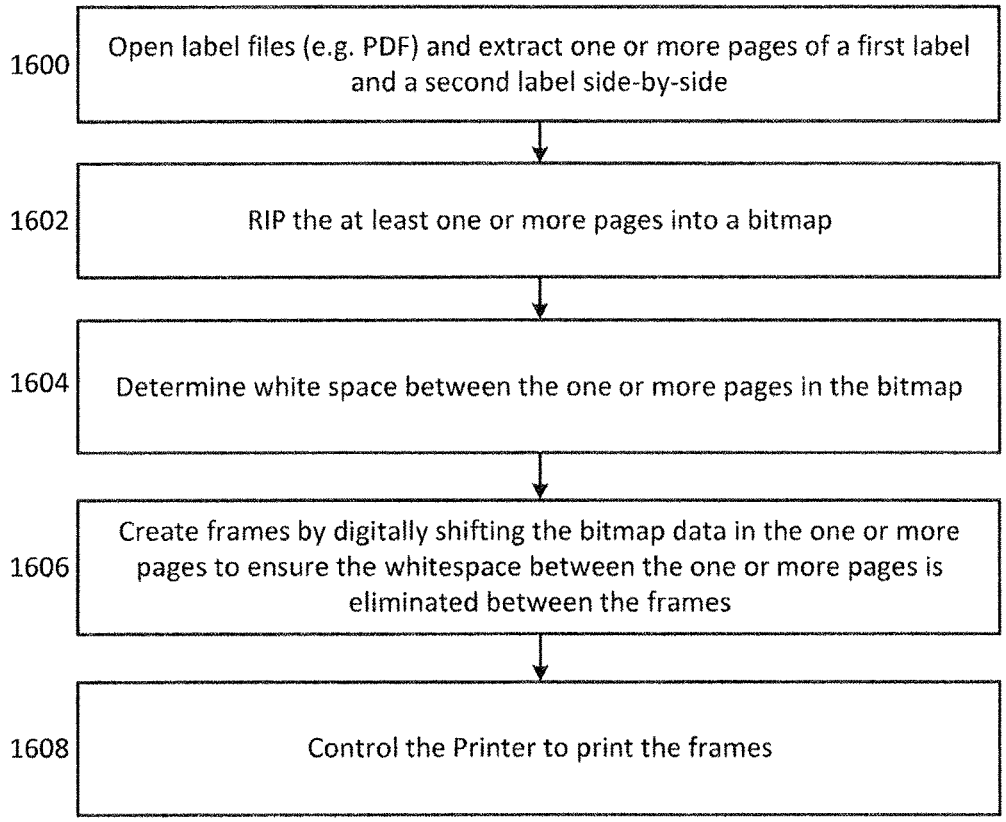
FIG. 16 shows a flowchart of an algorithm for printing labels according to FIG. 13.

A description of the overall process for the embodiment shown in FIG. 13 is described in more detail in the flowchart of FIG. 16. In step 1600, the system opens the multi-page label file and extracts the pages. In step 1602, the system then RIPs these multiple pages into multiple bitmaps. In step 1604, the system determines the white space between these bitmaps. In step 1606, the system then creates frames by digitally shifting each of the bitmaps by a specifically determined distance in order to ensure that the white space is reduced or eliminated between the frames. In step 1608, the system then controls the printer to print the frames.

In other embodiments having more than two labels (e.g. N labels) to be printed on the same web, the printing algorithm in FIG. 16 is similar. This is because the multi-page label file is RIPed on a page-by-page basis regardless of how many labels are positioned side-by-side within the file.

As described above, FIG. 12 suggests a post-RIP solution that utilizes label cells and physically shifts the web during printing. FIG. 13 also suggests a post-RIP solution that generates frames from each page of a multi-page PDF and then digitally shifts the frames. In yet another embodiment, these two solutions may be combined as a hybrid solution. Specifically, the frames may be generated based on cells similar to FIG. 12 but then digitally shifted (not physically shifted) similar to FIG. 13.

Figure 17:
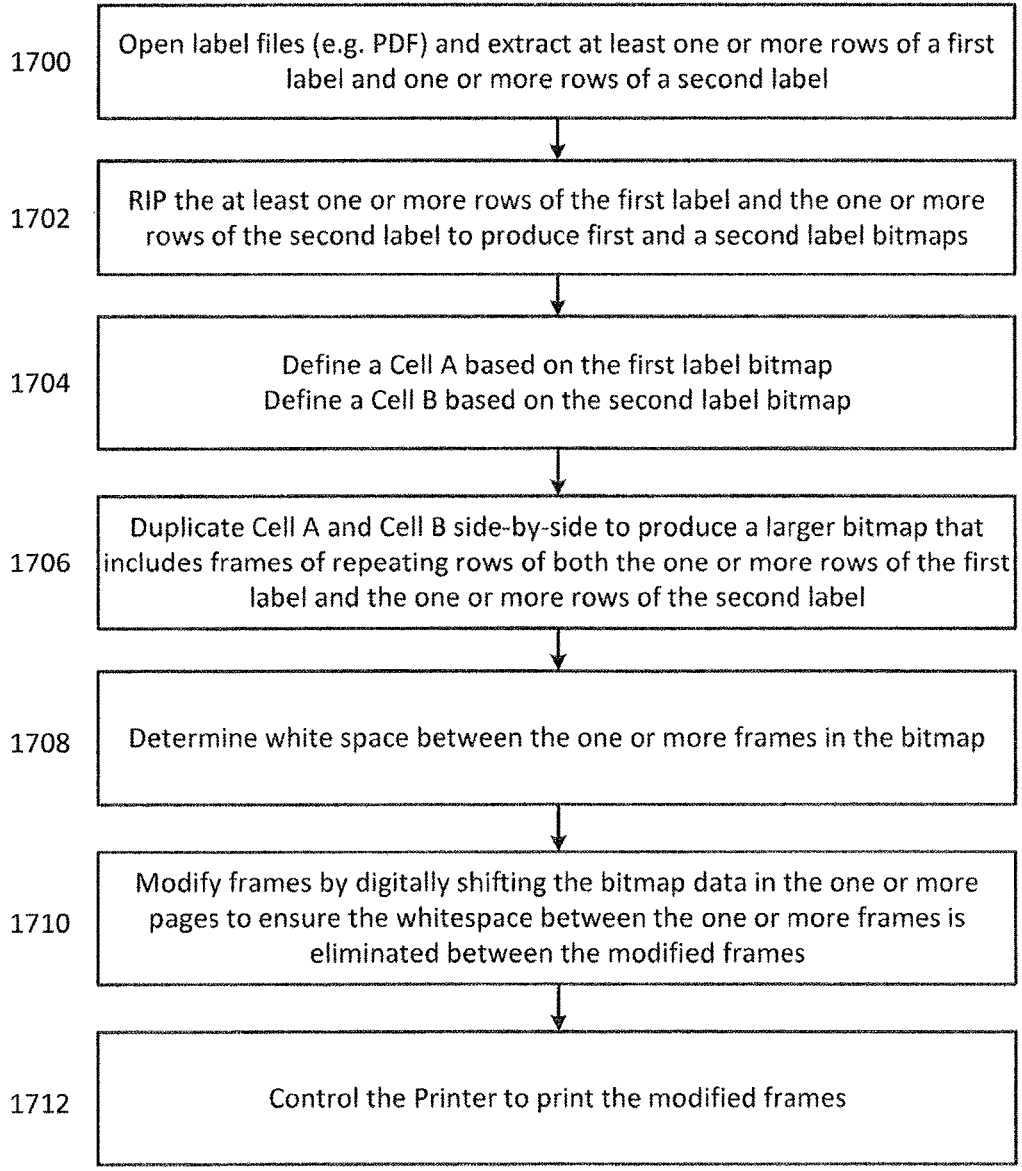
FIG. 17 shows a flowchart of an algorithm for printing labels according to a combination of FIGS. 12 and 13.

An explanation of this process is described with respect to the flowchart in FIG. 17. In step 1700, the system opens the multi-page PDF file and extracts one or more rows of labels. In step 1702, the system RIPs the rows to generate a first label bitmap and a second label bitmap (e.g. bitmap A and bitmap B). In step 1704, the system defines a first cell (e.g. Cell A) based on the first label bitmap, and defines a second cell (e.g. Cell B) based on the second label bitmap. In step 1706, the system duplicates Cell A and Cell B side-by-side to produce a larger bitmap that includes a frame of repeating rows. In step 1708, the system determines white space between the one or more frames in the bitmap. In step 1710, rather than physically shifting the web, the system digitally shifts the bit map in order to eliminate the white space. This process produces modified frames which are then printed in step 1712.

In other embodiments having more than two labels (e.g. N labels) to be printed on the same web, the printing algorithm in FIG. 17 is similar. For example, each of the N labels is: 1) extracted from the file, 2) RIPed (i.e. converted) into N bitmaps, 3) defined as respective N Cells, and then 4) duplicated side-by-side in order to produce the larger bitmap for printing.

Although the first three embodiments describe post-RIP solutions, the system may also be implemented in a pre-RIP solution (i.e., performing the shifting prior to RIP of the label files into bit maps). For example, the multi-page PDF 1300 shown in FIG. 13 includes pages 1304, 1306, 1308 and 1310 having white space between the pages within the PDF file itself. Rather than waiting to shift this data post-RIP, this data may be shifted within the PDF file itself. For example, the multi-page PDF 1300 shown in FIG. 13 may actually shift the data within the PDF to eliminate white spaces 1320, 1322 and 1324 as shown in the multi-page PDF 1400 which includes pages 1404, 1406 and 1408 which do not include white space between each frame. Since the white space has already been eliminated, the system can simply RIP each page of the PDF and then perform printing.

Figure 18:
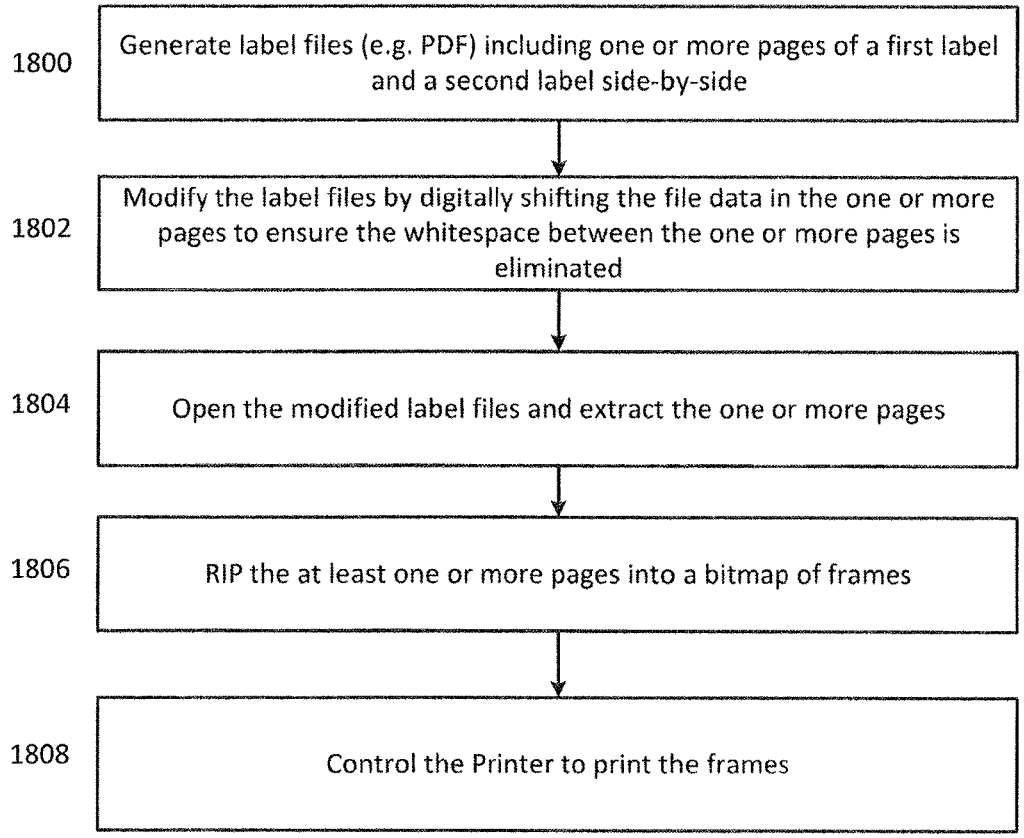
FIG. 18 shows a flowchart of an algorithm for printing labels according to FIG. 14.

Details of this operation are shown in more detail in the flowchart of FIG. 18. In step 1800, the system generates a label file (e.g., a multi-page PDF) which includes one or more pages of label A and label B. In step 1802, this PDF file is actually modified by digitally shifting the data within the PDF file to eliminate the white space. In step 1804, the modified PDF file is then opened and then extracted. In step 1806, the PDF file data is then RIPed into a bit map of frames. Finally, in step 1808, the printer is controlled in order to print the RIPed frames.

In other embodiments having more than two labels (e.g. N labels) to be printed on the same web, the printing algorithm in FIG. 18 is similar. For example, the multi-page PDF is: 1) opened, 2) modified by digitally shifting the data, 3) and then RIPed into a bit map of frames for printing. This is because the data in the multi-page PDF is digitally shifted prior to RIP processing regardless of how many labels are positioned side-by-side within the PDF.

As described above, the present invention is able to either reduce or eliminate white space or discontinuities when printing labels of different repeat lengths side by side on the same web. The white space or discontinuities can be eliminated either post-RIP (i.e., after converting to a bitmap) or pre-RIP (i.e., prior to converting to a bitmap). In addition, the shifting process can either be performed digitally (e.g., in the PDF file or in the bitmap files) or physically (e.g., the web can be stopped and reversed during the printing process). In either case, the white space is removed to ensure continuous printing of labels. It should be understood that discussion herein of printing "on a continuous web of substrate without excess white space between adjacent images or discontinuities between partial images in adjacent composite image groupings caused by the different first and second repeat lengths" does not mean that there is no white space between adjacent images or adjacent rows of images, but rather only that there is no white space between adjacent images in adjacent composite image groupings (i.e. frames, bitmaps, pages) inserted only to accommodate the different repeat lengths. White spaces may be intentionally inserted regularly or periodically between images or groups of images for reasons other than accommodating the repeat lengths (e.g. to accommodate cutting operations). And, if the differences in the repeat lengths would result in a continuous series of non-identical composite image groupings considered unwieldy or undesirable (e.g. a multipage document with too many pages), the spacing between adjacent images may be intentionally adjusted to optimize the number of groupings in the series (e.g. pages in the multipage document). However, within the series of non-identical composite image groupings, adjacent composite image groupings (e.g. pages or bitmap frames) do not have excess white space or discontinuities between them, in accordance with the various embodiments of this invention.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in fewer than all features of a single disclosed embodiment. Thus the following claims are hereby incorporated into the Detailed Description, with each claim standing on its own as a separately claimed subject matter.

What is claimed is:

1. A printing system comprising:
a printing mechanism for applying ink to a substrate;
a substrate feeder for positioning a continuous web of substrate relative to the printing mechanism to receive the ink, the substrate feeder configured to at least advance the substrate in a forward direction such that the substrate advanced past the printing mechanism in the forward direction contains the ink applied thereto;
digital information stored on computer readable media embodying:
one or more rows of a first image having a first repeat length side by side with one or more rows of a second image having a second repeat length different from the first repeat length, the one or more rows of the first image side by side with the one or more rows of the second image comprising a series of composite image groupings, wherein adjacent composite image groupings in the series are not identical;
instructions for manipulating the substrate feeder and the printing mechanism; and
a print controller configured to:
access the stored digital information and control the print mechanism and substrate feeder based upon said stored digital information to cause the first and second images to be printed on a continuous web of substrate without excess white space between adjacent images or discontinuities between partial images in adjacent composite image groupings caused by the different first and second repeat lengths,
wherein controlling the print mechanism and substrate feeder to print without the excess white space or discontinuities comprises one of: (a) periodically physically shifting the substrate in a reverse direction opposite the forward direction or (b) digitally shifting the image groupings before printing them.

2. The system of claim 1, wherein the print controller is further configured to:
perform a Raster Image Processing step comprising raster image processing at least the one or more rows of the first image and the one or more rows of the second image to produce two image bitmaps,
define a first cell of one or more rows of the first image,
define a second cell of one or more rows of the second image,
create frames by duplicating the first cell and the second cell side-by-side into a larger bitmap, wherein each frame comprises one of the composite image groupings,
prior to printing one or more of the frames, pause the print mechanism from printing, control the substrate feeder to physically shift the continuous web by a predetermined distance in the reverse direction, and then resume printing.

3. The system of claim 2, wherein the print controller is further configured to perform the step of creating the frames in one of: during printing, during the Raster Image Processing step, or offline in a post Raster Imaging Processing step.

4. The system of claim 1, wherein the print controller is further configured to:
determine from the digital information, a distance to shift the continuous web during printing,
periodically pause the print mechanism from printing, physically shift the continuous web in the reverse direction by the distance, and then resume printing.

5. The system of claim 1, wherein the print controller is further configured to determine a distance for physically shifting the continuous web or digitally shifting the image groupings by measuring a distance between a bottom of first image in a first image grouping to a top of a second image in a second image grouping adjacent the first image grouping in the series.

6. The system of claim 1, wherein the print mechanism comprises an intermediate drum printer or an inkjet printer.

7. The system of claim 1, wherein the series of image groupings comprise a series of pages in a multipage PDF file and the print controller is configured to digitally shift bitmap frames corresponding to the PDF file pages during printing, during a Raster Image Processing step before printing them, or offline in a post Raster Imaging Processing step.

8. The system of claim 1, wherein the printing system comprises a label printing system, the images comprise label images, and the substrate comprises a label substrate.

9. A printing system of claim 1 wherein the print controller is configured to:
create at least two initial consecutive bitmap frames corresponding to adjacent composite image groupings;
determine a digital shift distance required to prevent said excess white space and discontinuities between said adjacent composite image groupings;
modifying the at least two initial consecutive bitmap frames to create at least two modified consecutive bitmap frames reflecting the digital shift distance; and
printing from the modified consecutive bitmap frames.

10. The printing system of claim 9, wherein the at least two initial consecutive bitmap frames each have a different length relative to one another and the at least two modified consecutive bitmap frames have a same length relative to one another.

11. The system of claim 9, wherein the printer controller is further configured to:
create the bitmap by:
performing a Raster Image Processing step on at least the one or more rows of the first image to create a first bitmap and on the one or more rows of the second image to produce a second bitmap,
define first cell of one or more rows of the first image,
define a second cell of one or more rows of the second image, and
create frames by duplicating the first cell and the second cell side-by-side into a larger bitmap.

12. The system of claim 9, wherein the print controller is further configured to:
create the at least two initial consecutive bitmap frames by performing Raster Image Processing on at least two pages of a multipage document file.

13. The system of claim 9, wherein the print controller is further configured to determine the digital shift distance by measuring a distance between a bottom of first image on a first of the initial consecutive bitmap frames to a top of a second image on a second of the initial consecutive bitmap frames.

14. The system of claim 9, wherein determining the digital shift distance and creating the modified consecutive bitmap frames is performed either during printing, during a Raster Image Processing step, or offline in a post Raster Imaging Processing step.

15. The printing system of claim 1, wherein the digital information corresponding to the series of consecutive image groupings comprises a first multipage document file and the print controller is configured to perform the step of digitally shifting the image groupings by generating a second multipage document file reflecting the digital shifting applied to one or more adjacent consecutive image groupings in the first document file.

16. The system of claim 15, wherein digitally shifting the image groupings includes moving data from one page of the first multipage document file to a different corresponding page of the second multipage document file.

17. The system of claim 16, wherein the data includes a first amount of data corresponding to the first image and a second amount of data corresponding to the second image, wherein the first is different than the second amount.

18. The system of claim 15, wherein the first and second multipage document files are multipage PDF files.

19. A printing system comprising:
a printing mechanism for applying ink to a substrate;
a substrate feeder for positioning a continuous web of substrate relative to the printing mechanism to receive the ink;
digital information stored on computer readable media comprising a multipage document and instructions for manipulating the substrate feeder and the printing mechanism, the multipage document embodying one or more rows of a first image having a first repeat length side by side with one or more rows of a second image having a second repeat length different from the first repeat length,
wherein adjacent pages in the multipage document are not identical and at least one set of adjacent pages comprises a first portion of one row of the first or second images on a first page and a second portion of the one row on a second page;
a print controller configured to access the stored digital information and control the print mechanism and substrate feeder based upon said stored digital information to cause the first and second pages to print adjacent one another without a margin between them such that the first portion of the one row and the second portion of the one row print without a discontinuity.

20. A method of printing comprising using a printing system comprising a printing mechanism for applying ink to a substrate, a substrate feeder for positioning a continuous web of substrate relative to the printing mechanism to receive the ink, and a print controller, the method comprising the steps of:

(a) accessing digital information stored on computer readable media, the digital information embodying:
  (i) one or more rows of a first image having a first repeat length side by side with one or more rows of a second image having a second repeat length different from the first repeat length, the one or more rows of the first image side by side with the one or more rows of the second image comprising a series of composite image groupings, wherein adjacent composite image groupings in the series are not identical; and
  (ii) instructions for manipulating the substrate feeder and the printing mechanism; and
(b) printing the first and second images on a continuous web of substrate without excess white space between adjacent images or discontinuities between partial images in adjacent composite image groupings caused by the different first and second repeat lengths, wherein said printing comprises one of: (i) periodically physically shifting the substrate in a reverse direction opposite the forward direction or (ii) digitally shifting the image groupings before printing them.

21. A method of printing comprising using a printing system comprising a printing mechanism for applying ink to a substrate, a substrate feeder for positioning a continuous web of substrate relative to the printing mechanism to receive the ink, and a print controller, the method comprising the steps of:

(a) accessing digital information stored on computer readable media, the digital information comprising a multipage document and instructions for manipulating the substrate feeder and the printing mechanism, the multipage document embodying one or more rows of a first image having a first repeat length side by side with one or more rows of a second image having a second repeat length different from the first repeat length,
wherein adjacent pages in the multipage document are not identical and at least one set of adjacent pages comprises a first portion of one row of the first or second images on a first page and a second portion of the one row on a second page;
(b) printing the first and second pages adjacent one another without a margin between them, such that the first portion of the one row and the second portion of the one row print without a discontinuity.

* * * * *